United States Patent [19]
Goucher et al.

[11] Patent Number: 4,505,364
[45] Date of Patent: Mar. 19, 1985

[54] PUSH-BUTTON CLUTCH CONTROL SYSTEM

[76] Inventors: Ralph F. Goucher; Kathleen S. Goucher, both of 104 Diamond Dr., Livermore, Calif. 94550

[21] Appl. No.: 218,565

[22] Filed: Dec. 22, 1980

Related U.S. Application Data

[63] Continuation of Ser. No. 76,558, Sep. 18, 1979, abandoned.

[51] Int. Cl.³ .............................................. B60K 41/02
[52] U.S. Cl. .......................... 192/0.02 R; 192/0.096; 192/3.58; 192/83
[58] Field of Search .............. 192/0.02 R, 3.58, 0.096, 192/3.63, 99 S, 99 A, 83, 84 R

[56] References Cited

U.S. PATENT DOCUMENTS

| | | | |
|---|---|---|---|
| 1,747,190 | 2/1930 | Sheirs | |
| 1,996,256 | 4/1935 | Price et al. | 192/30 W |
| 2,078,173 | 4/1937 | Brewer | 192/91 |
| 2,132,721 | 10/1938 | Clarke | 192/1 |
| 2,334,003 | 11/1943 | Heintz | 192/83 |
| 2,647,600 | 8/1953 | Anderson | 192/30 W |
| 2,916,118 | 12/1959 | Backus, et al. | 192/3.5 |
| 2,975,875 | 3/1961 | Edelblut | 192/3.58 |
| 3,195,417 | 7/1965 | Hager et al. | 91/374 |
| 3,292,751 | 12/1966 | McRay et al. | 192/83 X |
| 3,379,291 | 4/1968 | Randol | 192/83 X |
| 3,435,929 | 4/1969 | Thompson | 192/3.5 |
| 3,896,914 | 7/1975 | Konsbruck et al. | 192/0.02 R |
| 4,155,436 | 5/1979 | Wilkinson et al. | 192/0.02 R |

Primary Examiner—George H. Krizmanich
Attorney, Agent, or Firm—Francis H. Lewis

[57] ABSTRACT

Apparatus is provided for manual control of a clutch in a motor vehicle having a manual gear shift control. The normal foot-pedal operation of the clutch is not impaired, and may be employed concurrently with the manual control system. Manual control is obtained by electrically switching a hydraulic pump, which in turn drives a cylinder and piston mechanically linked to the conventional clutch pedal. Additional switches are provided for disconnecting the pump when the clutch reaches its engaged or disengaged positions, and indicator lights are further provided to signal the driver when these positions are attained.

10 Claims, 4 Drawing Figures

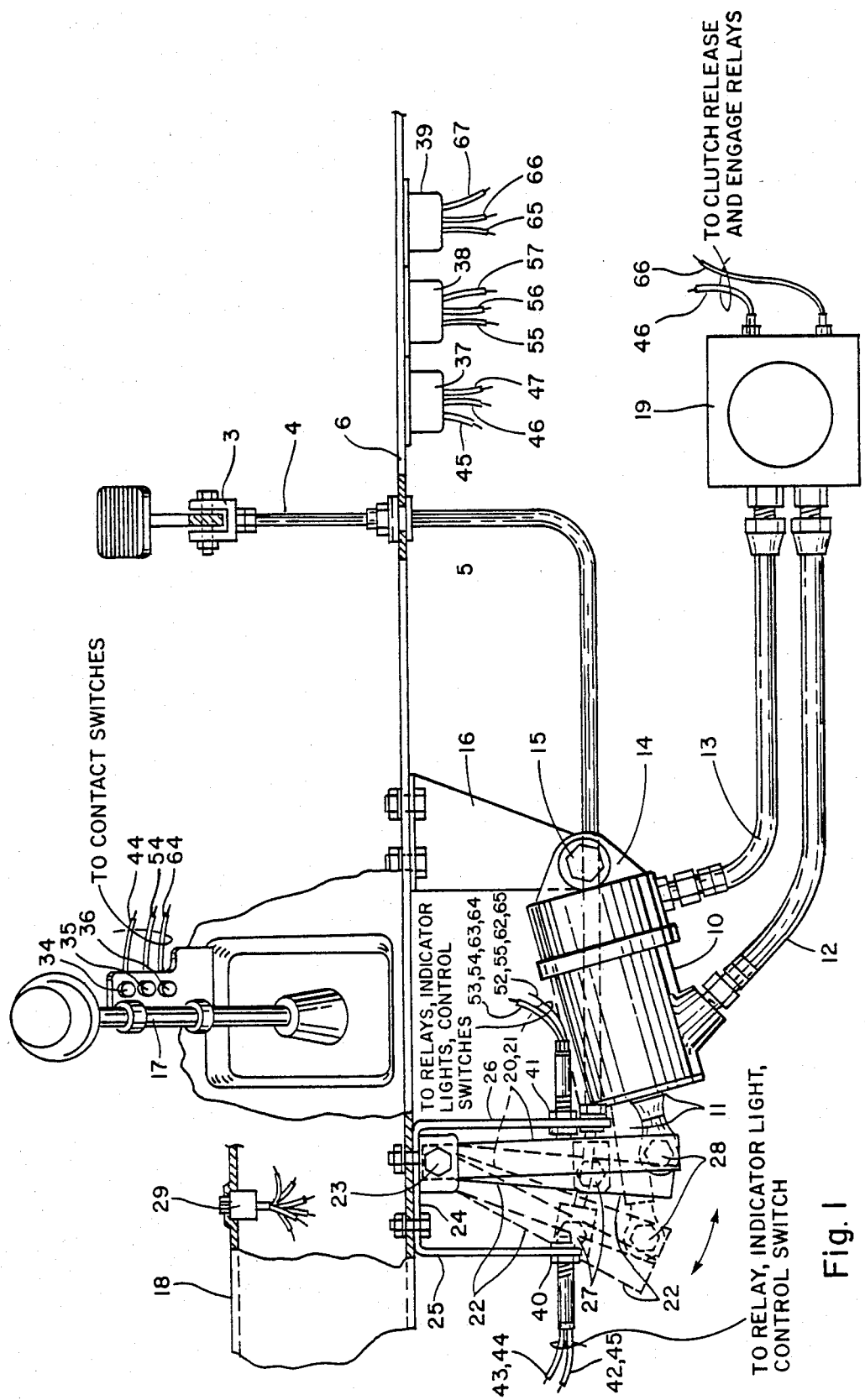

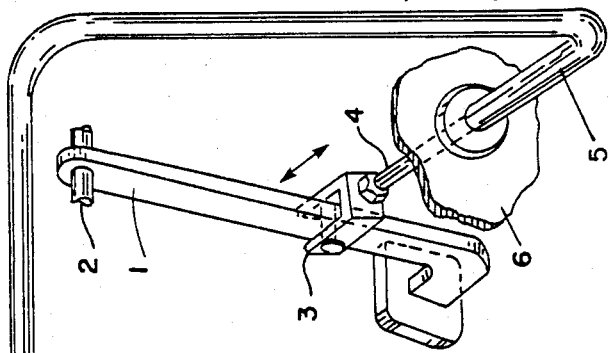
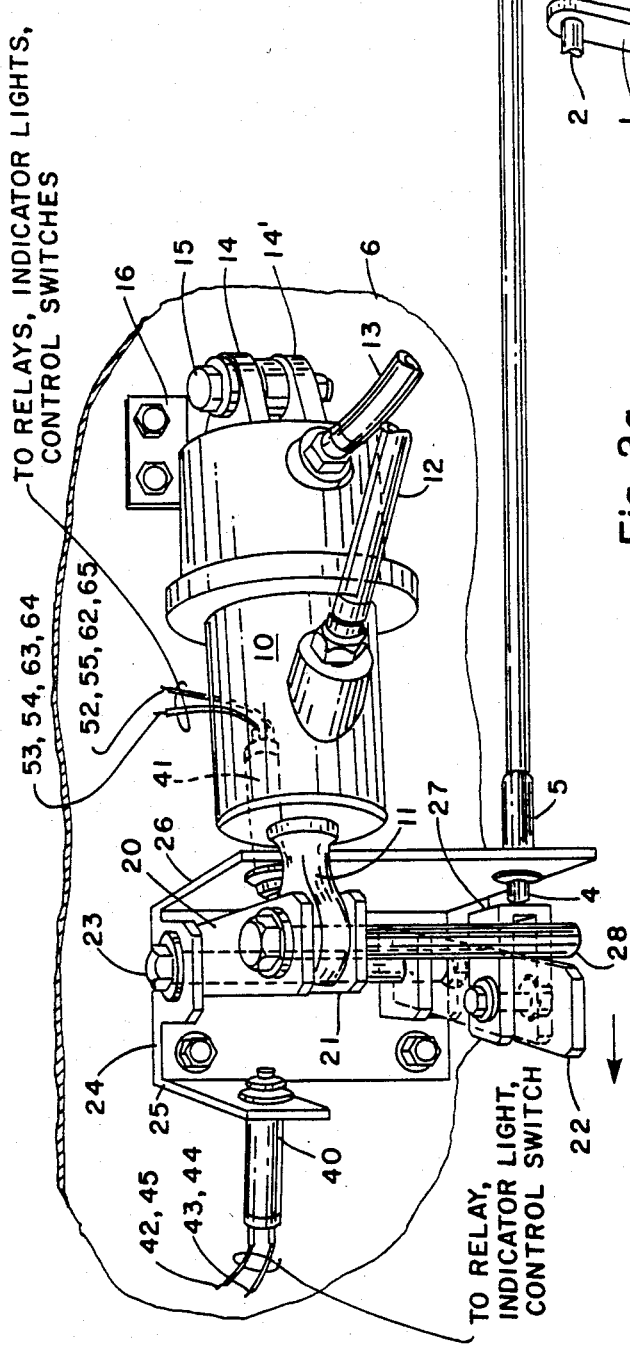
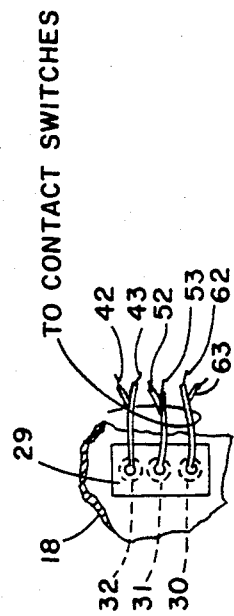
Fig. 2a
Fig. 2b

PUSH-BUTTON CLUTCH CONTROL SYSTEM

This application is a continuation of application Ser. No. 06/076,558, filed Sept. 18, 1979, now abandoned.

BACKGROUND OF THE INVENTION

1. Field of the Invention

This invention relates to power-operated clutch control mechanisms for motor vehicles and other power transmission systems, and in particular, this invention relates to electrically actuated manually controlled automobile clutches for persons who are handicapped or are otherwise unable to operate clutches that are controlled by foot pedals in cars having manual transmissions.

2. Description of the Prior Art

Despite the advent and popularity of automatic transmissions, a great many automobiles and trucks presently are constructed with manually operated gear shifts. Cars with manual transmissions enjoy several advantages generally, including increased fuel efficiency and better control of the vehicle. However, such cars must be equipped with independently operated clutches to disengage the engine from the drive shaft while the gears are being shifted. Since this action requires the application of substantial force, a purely mechanical clutch must be actuated by the driver through a foot pedal mechanism. This type of vehicle, although very common, has the disadvantage of being difficult or impossible to operate for drivers who have suffered the impairment or loss of a leg. Such drivers are generally restricted to operation of vehicles with automatic transmissions.

The prior art includes vehicles with manually operated throttles, brakes, and headlight dimmer switches. Manual clutch control systems have been disclosed also that are hydraulically or pneumatically powered, using compressed air, brake-type fluid, or similar working fluids, or connected to the engine manifold vacuum system. These clutches are controlled generally by manual operation of a hydraulic valve or fluid switch, whereby a source of hydraulic power may be connected to a hydraulic cylinder and piston arrangement or other equivalent energy-conversion mechanism which drives the clutch plates. These valves have an on-off character which precludes a gradual engagement or disengagement of the clutch, and the rate of operation of the clutch is not subject to the driver's control, but is determined by the parameters of the hydraulic circuit in these systems. Hence, "feathering" a clutch, gradual engagement of the clutch when starting the vehicle from a standstill, or slipping the clutch while driving under special conditions, is not feasible with such a manual control valve. Therefore, this system can only supplement the conventional pedal clutch control, and it is not satisfactory for a driver who has completely lost the use of his clutch pedal leg.

The prior art also discloses hydraulically or pneumatically actuated manual clutch control systems having a slower or variable rate of clutch engagement to enable such systems to start up the vehicle from a dead stop and to provide better control of the vehicle. One device includes means for constricting the flow of working fluid momentarily at the time when the clutch plates are nearing the point of engagement. Another system provides a dashpot connected to the linkage mechanism which retards the axial motion of the clutch plates at the point of engagement. The dashpot resistance is governed by the engine throttle in such a way that the inhibitory effect is decreased as the throttle is opened, so that the clutch engages more rapidly at greater engine speeds. Although these systems partially overcome the disadvantages discussed above, they do not allow the driver to control independently the rate of clutch engagement, and therefore they provide less control over the vehicle operation in comparison with the conventional pedal-operated clutch control systems. Furthermore these systems contain mechanically complex and expensive components with many moving parts. They are subject to wear and require additional maintenance and adjustment for proper operation. The practical limitations of these systems have therefore precluded their widespread use.

In summary, there is no manual clutch control system presently available which allows handicapped individuals to operate motor vehicles with satisfactory control and which is relatively inexpensive, easy to adjust and maintain, and simple to install in a conventional vehicle.

SUMMARY OF THE PRESENT INVENTION

The present invention discloses a manual clutch control system which may be easily installed in a motor vehicle equipped with conventional manual transmission and pedal-operated clutch control mechanisms. This system features a reversible hydraulic cylinder and piston connected through a cable directly to the clutch pedal. The working fluid is driven into the cylinder in either direction by a variable-speed electric pump, controlled by push-button switches located on the gear shift lever within easy reach of the driver's fingers, and powered by the automobile electric system. Indicator lights are mounted on the dashboard to inform the driver when the clutch is in the fully engaged or fully disengaged position.

It is a general object of the present invention to provide a manual clutch control system, auxiliary to and independent of the conventional foot-pedal clutch control system, which allows handicapped drivers to operate a motor vehicle with an optimal degree of control.

A more specific object of this invention is to provide a manual clutch control system which enables the operator to govern the rate of clutch engagement, or disengagement.

It is an ancillary object of this invention to provide a manual clutch control mechanism that is conveniently operable with the operator's fingers of the same hand that is concurrently manipulating the gear shift lever.

A further object of the present invention is to provide a simple manual clutch control device which can be built and installed in a conventional vehicle having a pedally controlled clutch and a manually controlled transmission, and which will be sufficiently rugged to be capable of operation with a minimum of maintenance, adjustment and expense.

Further objects, purposes, and advantages of the present invention will be readily apparent to persons skilled in the relevant art to which this invention pertains upon examination of the following detailed description of the preferred embodiment, together with the accompanying drawings.

BRIEF DESCRIPTION OF THE DRAWINGS

FIG. 1 is a partially schematic cutaway plan view of portions of the engine compartment and driver's compartment of a motor vehicle, showing the location of components of the control system attached to the firewall, dashboard, clutch pedal and gear shift lever, together with the electric pump.

FIG. 2a is an oblique perspective elevational view of the hydraulic cylinder and mechanical linkage mechanism mounted on the vehicle firewall shown in cutaway sections, together with a rear view of the clutch pedal showing the cable connection between it and the mechanical linkage mechanism.

FIG. 2b shows a rear view (i.e. looking toward the rear of the vehicle) of a section of the dashboard on which the indicator lights are mounted.

DETAILED DESCRIPTION OF THE PREFERRED EMBODIMENT

Figure 3:
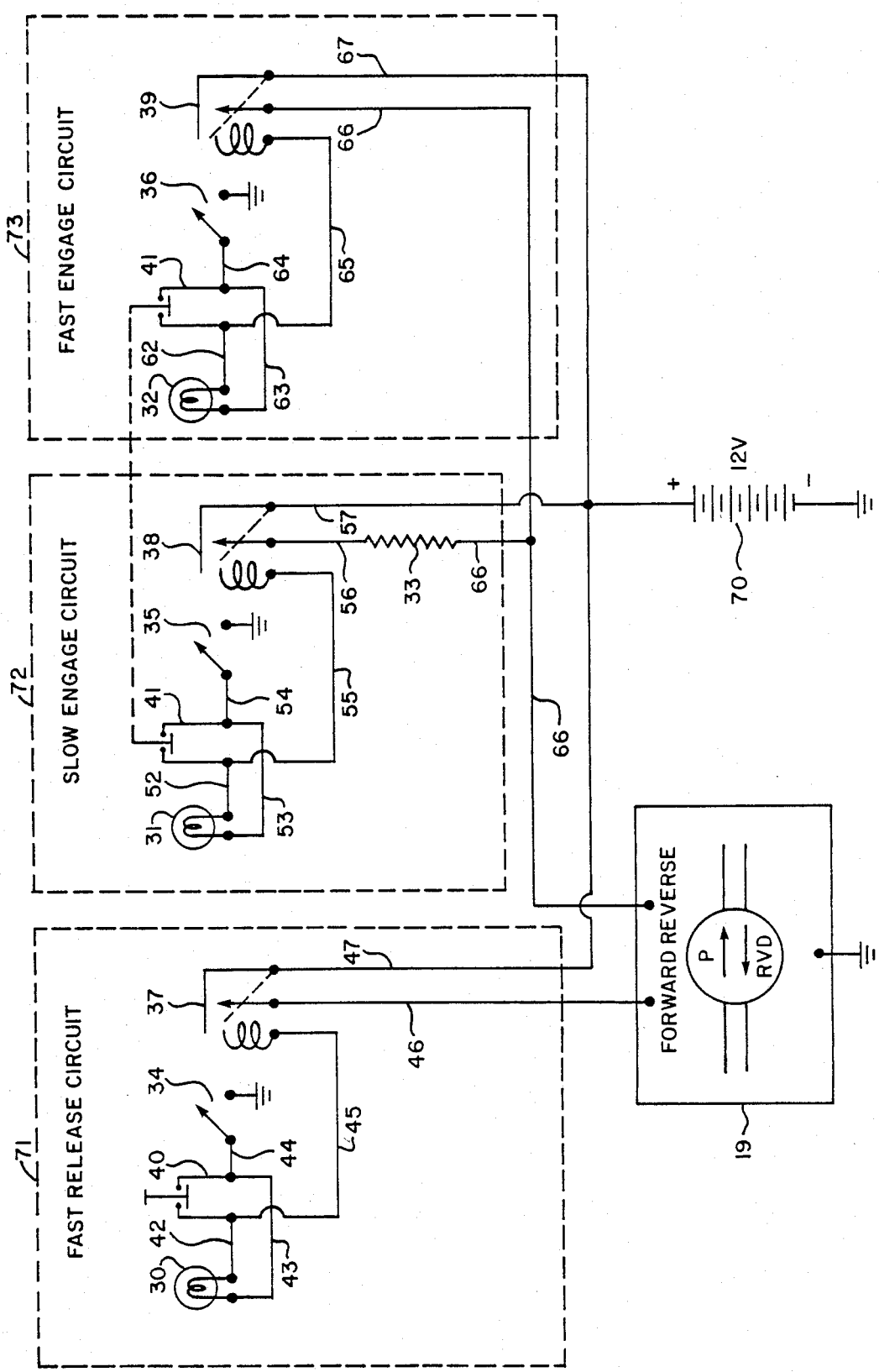
FIG. 3 is a circuit diagram showing the electrical components of the control system and their interconnection.

Referring first to FIG. 2a, the clutch pedal 1 is assumed to be supported by a horizontal pivot 2 about which the pedal rotates when depressed by the operator's foot. The mechanical linkage between the pedal and the clutch itself is not shown and is not relevant to the description of this invention. The U-joint 3 is attached to the pedal arm by a horizontal pivot pin about which the joint is constrained to rotate partially, and the central section of the U-joint is fastened to the cable 4 which passes through a hole in the firewall 6 and through a cable sheath 5. The hole is located in a position such that tension on the cable pulls the clutch pedal toward the disengage position. It is assumed that the clutch pedal is also attached to a spring, not shown, tending to urge the pedal toward the engage position.

A U-shaped bracket is mounted with its flat central portion 24 bolted flush against the firewall and the vertical sides 25 and 26 extending perpendicularly toward the front of the vehicle. Also extending perpendicularly frontward are flat horizontal ears at the top and bottom of the bracket between these two sides, and a vertical pin or bolt 23 passes through and is supported by these ears. This pin in turn supports two horizontal flat parallel driver arms, 20 and 21, of equal length, located near its upper end and spaced a short vertical distance apart, each arm having a hole near one end through which this pin passes so that each arm can rotate about this pin in a horizontal plane. The pin also supports a horizontal flat idler arm 22 of the same length near its lower end, passing through a hole near one end of the arm, so that this arm is also constrained to rotate about the pin in a horizontal plane. Near the center of this arm is fastened a horizontal flat U-joint 27 by means of a short vertical pin passing through holes in the arm and sides of the U-joint. The vertical central portion of this U-joint is attached to the other end of the cable 4, which extends laterally and horizontally from the arm toward one side 26 of the bracket, and passes through a hole in this side located at the same elevation as the idler arm 22. The cable sheath 5 is attached to the other side of this hole. Thus, the idler arm is attached through the cable to the clutch pedal, and it rotates about the pin 23 as the pedal is depressed and released, owing to the stiffness of the cable.

Near the outer ends of the driver arms 20 and 21 are two holes aligned to accommodate the vertical pin 28 passing through and supported by them, and constraining the two arms to rotate about the pin 23. This pin 28 extends downward to a point below the elevation of the arm 22. The pin is located between the idler arm and the side 26 of the U-shaped bracket. Thus, the pin engages the idler arm and causes it to rotate away from the side 26 when the driver arms rotate in that direction.

Also fastened to the side 26 of the U-shaped bracket is the electrical switch 41, located at the elevation of the driver arm 21 near its center. This switch has a small button extending toward the driver arm, such that when the arm is rotated to its extreme position toward this side of the bracket it presses the button and opens the switch. A similar switch 40 is located at the same elevation and position on the opposite side 25 of the bracket, and this switch 40 is opened when the arm reaches its extreme position away from the bracket side 26. The bracket sides 25 and 26 are of horizontal length slightly greater than half the length of the idler arms, and the contact switches and cable sheath are located near the edges of these sides.

Pivotally fastened to the pin 28 between the two driver arms 20, 21, is the end of a piston rod 11 extending laterally from the arms on the same side as the switch 41 and cable sheath 5, but located beyond the end of the bracket side 26. This rod is connected to a reversible hydraulic piston and cylinder 10, horizontally disposed, and constrained to rotate in a horizontal plane relative to the driver arms. The opposite end of the cylinder 10 is supported by two flat parallel horizontal ears 14, 14', spaced a short distance apart vertically. A second bracket 16, rigidly attached to the firewall 6, has a flat horizontal portion extending into the space between these ears. The cylinder is pivotally attached to this second bracket by means of a vertical pin 15 passing through and supported by aligned holes in the ears and the bracket 16. Thus, the cylinder 10 is also constrained to rotate relative to the bracket 16 in a horizontal plane.

Referring still to FIG. 2a, and also to FIG. 1, the piston and cylinder is driven to its retracted and extended positions by hydraulic pressure of the working fluid in two hoses 12 and 13 respectively, attached to the cylinder. The opposite ends of these hoses are attached to the reversible variable-speed hydraulic pump 19, which is also located within the engine compartment.

Still referring to FIG. 1, there are also mounted on the firewall three electrical relays, 37, 38, and 39. The gear shift lever 17 in the driver's compartment is fitted with three push-button electric switches 34, 35, and 36, all located within reach of the fingers of the driver's hand on the gear shift lever. Finally, referring to FIG. 1 and also to FIG. 2b, the dashboard 18 has a small panel 29 on which are mounted three indicator lights 30, 31, and 32, in the field of vision of the driver.

Referring now to FIG. 3, the electrical portion of this system includes three sections, namely a fast release circuit 71, a slow engage circuit 72, and a fast engage circuit 73. These circuits control the operation of the pump 19 during the corresponding actions of the clutch. This circuit is shown for the case of a negatively grounded automobile electric system. The positive terminal of the automobile battery 70 is connected to the three armature terminals of the relays 37, 38, and 39, through lines 47, 57, and 67 respectively. The switch terminal of the relay 37 is connected to the "forward" terminal of the pump 19 through line 46. The switch terminal of the relay 39 is connected through line 66 to the "reverse" terminal of the pump, and the switch terminal of the relay 38 is also connected to this "reverse" terminal through a series resistor 33 via line 56.

The pump 19 is a reversible variable delivery hydraulic driver having a flow rate which is controlled by the voltage at the terminals for "forward" or "reverse" pumping directions.

One side of the contact switch 40 is connected through line 45 to the winding terminal of the relay 37, and via line 42 to one terminal of the indicator lamp 30. The other side of the switch is connected to the other side of the indicator lamp via line 43, and to the push button switch 34 via line 44. The other side of the switch 34 is grounded.

The slow engage circuit 72 comprises a relay 38, contact switch 41, indicator lamp 31, and push button switch 35 which are all connected together in identically the same manner as the corresponding elements 37, 40, 30 and 34 respectively of the fast release circuit described above. However, the contact switch 41 is a double-pole switch, one pole of which is connected to the slow engage circuit in the manner just described. The other pole of the contact switch 41 is connected to the fast engage circuit together with the relay 39, indicator lamp 32, and push-button switch 36, again in the same manner as the corresponding elements 40, 37, 30 and 34 respectively of the fast release circuit, as shown in FIG. 3.

The indicator lamps 30, 31, and 32 are low-current bulbs, typically rated at 0.075 amperes for 12 volts, having jewels of different colors to enable the driver to distinguish them easily without taking his eyes off the road. They indicate to the driver when the clutch is in the fully engaged or disengaged positions.

It will be noted that this control system does not impair or interfere with the normal foot-pedal operation of the clutch in the conventional manner. When the clutch pedal is depressed, the cable 4 is pushed into the sheath 5. The opposite end of the cable 4 then pushes the idler arm 22 away from the side 26 of the U-shaped bracket. Normally the piston is in the retracted position, so that the driver arms 20, 21 are in the extreme position nearest the side 26 of the U-bracket. Therefore the idler arm can rotate freely through its entire range of angular displacement without encountering the pin 28. Thus, when the clutch pedal is released, the cable 4 is pulled back through the sheath, and the idler arm 22 is in turn drawn to its extreme position nearest the side 26 of the U-bracket. In short, the mechanism is unaffected by the depression and release of the clutch pedal.

Manual disengagement of the clutch is activated by depressing the push-button 34 on the shift lever 17. Since the contact switch 40 is normally in the closed position, this causes current flow through the winding of the relay 37, which then closes. This in turn sends current to the "forward" terminal of the pump 19, and forces hydraulic fluid into the cylinder 10, causing the piston rod to move out of the cylinder. The piston rod drives the driver arms 20, 21 toward the side 25 of the U-shaped bracket, i.e. toward the disengaged position, and the pin 28 engages the idler arm 22 and urges it also toward the disengaged position. This idler arm 22 pulls on the cable 4 connected to the clutch pedal 1, and the clutch is thereby disengaged. When the driver arm 21 achieves its extreme position, it opens the contact switch 40, causing current to flow through the indicator lamp 30, which signals the driver that the clutch is fully disengaged. This current is sufficiently small the relay 37 opens and the pump 19 ceases operation. The clutch is thereby maintained in the disengaged position, and the driver may shift gears.

To re-engage the clutch the driver may press the button 36 in the fast engage circuit, causing the above sequence of events to occur in reverse. Since the contact switch 41 is closed, current flows through the winding of the relay 39 and closes it. This causes current flow to the "reverse" terminal of the pump 19. This pump then drives fluid into the cylinder in the reverse direction, causing the piston rod to retract. The driver arms 20, 21 are thereby pulled back to the extreme position nearest the side 26 of the U-bracket, i.e. the engaged position. The force exerted by the pin 28 on the idler arm 22 is released, and the clutch pedal spring draws the clutch, pedal 1, cable 4, and idler arm 22 back to the engage position. When the driver arm 21 reaches its extreme position it presses the contact switch 41, opening the circuit. Current thereby flows through the indicator lamp 32, and the relay 39 opens. The pump 19 is thus turned off, and the indicator lamp signals the driver that the clutch is fully engaged.

The slow engage circuit 72 functions in exactly the same way as the fast engage circuit described above, where the relay 38, switch 35, and lamp 31 operate in the same manner as the relay 39, switch 36, and lamp 32 respectively. The slow engage circuit utilizes the other pole of the contact switch 41. However, the current supplied to the pump 19 by this circuit flows through the series resistor 33. The voltage at the pump terminal is therefore lower for the slow engage circuit than for the fast engage circuit and the fluid pumping rate and pressure are correspondingly lower.

Thus, this system allows the driver to engage the clutch manually at two different rates. When starting the vehicle from a standstill it is desirable to engage the clutch gradually, and this is accomplished by pressing the slow engage circuit button 35. When shifting into higher gears, the driver depresses the fast engage circuit button 36 to cause rapid clutch engagement.

Although this particular embodiment is designed to obtain two different clutch engagement rates, it is obvious that more circuits of exactly the same type could be added to obtain a multiplicity of different engagement speeds. Indeed, it is apparent that one could obtain a continuous range of engagement rates by the obvious modification of replacing the fixed resistor by a variable resistance. Other variations and modifications of this invention will readily occur to persons skilled in the art, and it is not intended that this invention be limited to the exact embodiment shown and described above, but that it encompass all such variations and modifications.

We claim:

1. A mechanism for controlling a clutch in the power transmission system of a motor vehicle having a manually operated lever for shifting gears in the system, said clutch being operable by depressing and releasing a foot pedal, said motor vehicle further having an electrical power source, comprising:

a reversible hydraulic pump connected to and driven by said electrical power source;

primary electrical switching means governing the amount of electrical power delivered to said pump from said electrical power source and controlling the direction and flow rate of fluid driven by said pump;

a pressure responsive cylinder having relatively movable housing and piston elements;

hydraulic conduit means connecting said pressure responsive cylinder to said pump, enabling said pump to drive said piston element in either the extended or retracted direction relative to said housing element;

mechanical linkage means connecting said pressure responsive cylinder to said clutch foot pedal, such that said pedal is driven by the relative motion of said piston and housing elements; and secondary electrical switching means connected to said pump, actuated by said mechanical linkage means, such that the electrical power supplied to said pump by said primary switching means is turned off by said secondary switching means when said clutch attains either its fully engaged or fully disengaged positions.

2. A mechanism as recited in claim 1, wherein said mechanical linkage automatically disconnects said piston element from said clutch foot pedal when said pedal is depressed.

3. A mechanism as recited in claim 1, wherein said primary switching means comprises a plurality of push-buttons located on said gear shift lever such that said buttons may be operated by the fingers of the hand grasping the lever.

4. A mechanism as recited in claim 1, further comprising a plurality of indicator lights connected electrically to said secondary electrical switching means, said lights being located within view of the vehicle operator, such that said lights indicate when said clutch attains either its fully engaged or fully disengaged position.

5. A mechanism for controlling a clutch in the power transmission system of a motor vehicle having a manually operated lever for shifting gears in the system, said clutch being operable by depressing and releasing a foot pedal, said motor vehicle further having an electrical power source, comprising:

an electric motor driven by said electrical power source;

linkage means transmitting mechanical power from said electric motor to said clutch pedal, such that the actuation of said motor drives and controls the motion of said clutch pedal; and electrical switching means controlling the speed and direction of said electric motor.

6. A mechanism as recited in claim 5, wherein said linkage means is automatically disconnected from said clutch pedal when said pedal is depressed.

7. A mechanism as recited in claim 5, further comprising secondary electrical switching means connected to said electric motor, actuated by said linkage means such that the electrical power supplied to said electric motor is turned off by said secondary switching means when said clutch attains either its fully engaged or fully disengaged positions.

8. A mechanism as recited in claim 7, further comprising signal means connected to said secondary electrical switching means indicating when said clutch attains either its fully engaged or fully disengaged positions.

9. A mechanism as recited in claim 8, wherein said signal means comprises a plurality of indicator lights located within view of the vehicle operator.

10. A mechanism as recited in claim 5, wherein said electrical switching means comprises a plurality of push-buttons located on said gear shift lever such that said buttons may be operated by fingers of the hand grasping the lever.

* * * * *